Dec. 14, 1948.  W. S. BERRY  2,456,364
DIAPER WASHER

Filed May 13, 1947  2 Sheets-Sheet 1

INVENTOR.
WILLIAM S. BERRY
BY Victor J. Evans & Co.
ATTORNEYS

Dec. 14, 1948. W. S. BERRY 2,456,364
DIAPER WASHER
Filed May 13, 1947 2 Sheets-Sheet 2
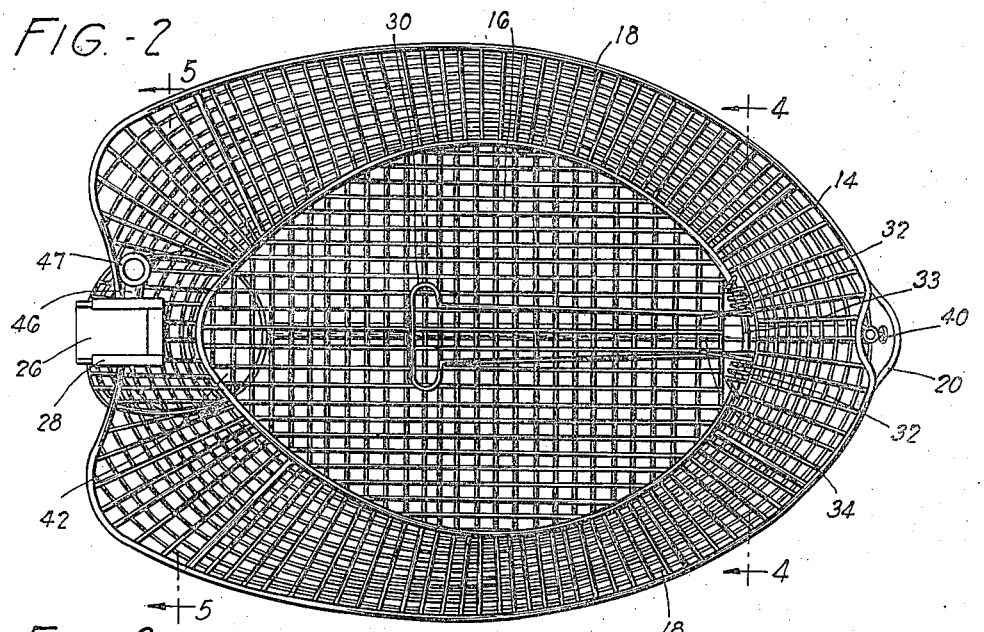
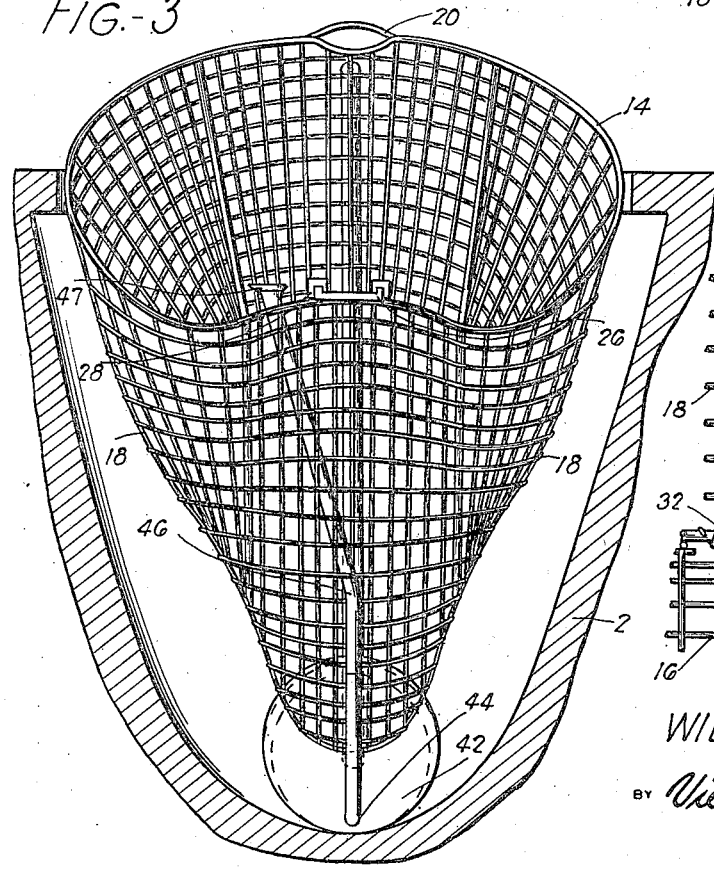
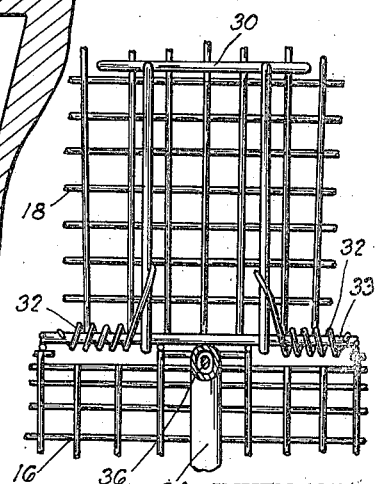
INVENTOR.
WILLIAM S. BERRY
BY Victor J. Evans & Co.
ATTORNEYS Patented Dec. 14, 1948

2,456,364

UNITED STATES PATENT OFFICE 2,456,364

DIAPER WASHER

William S. Berry, Buffalo, N. Y.

Application May 13, 1947, Serial No. 747,721

7 Claims. (Cl. 68—235)

My present invention relates to an improved diaper washer of the type comprising an open mesh basket made of wire, plastic, aluminum or other material or container so formed as to fit into the conventional toilet hopper or bowl and effecting a unique and novel structure particularly adapted to the washing of diapers.

The device of my invention in addition includes a valve structure of closing the outlet of the bowl to raise the water level, and diverting means for directing the rear flow of water from the outlet pipe over the diapers in the basket.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 2 is a top plan view of the basket.

Fig. 3 is a transverse sectional view at line 3—3 of Fig. 1.

Fig. 4 is an enlarged transverse sectional view at line 4—4 of Fig. 2.

Figure 1:
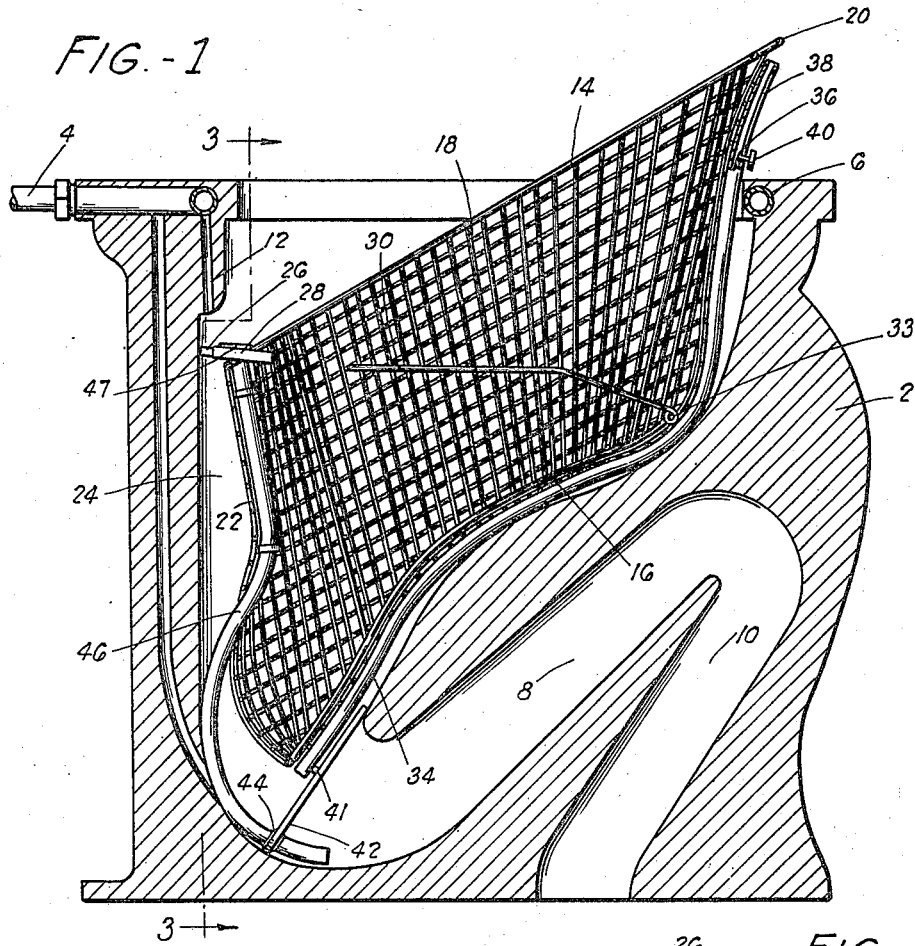
Fig. 1 is a longitudinal vertical sectional view of a hopper showing the basket of my invention therein.
Figure 6:
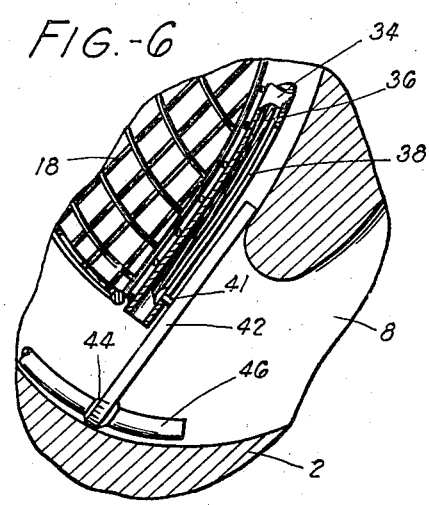
Fig. 6 is an enlarged sectional view of the bottom of the basket and the valve.
Figure 5:
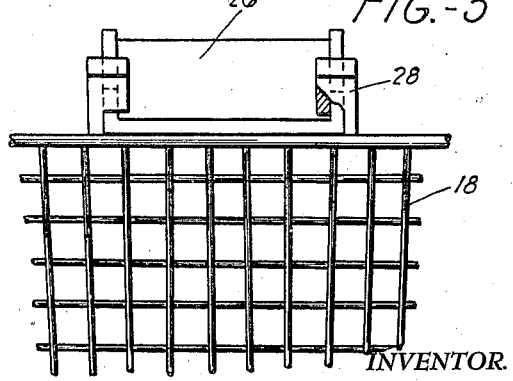
Fig. 5 is an enlarged sectional view at line 5—5 of Fig. 2.

Referring now to the drawings wherein I have illustrated the present preferred embodiment of my invention, I utilize the usual hopper bowl 2 having an inlet pipe 4 and a rim discharge tube 6, the hopper having a conventional outlet passage 8 passing over the trap 10.

A rear inlet tube 12 permits a stream of water to enter the bowl when the bowl is flushed.

My invention consists in a basket 14 of open mesh, plastic, aluminum or other suitable material having an inclined curved bottom 16 and ovate side wall 18 formed of a shape to fit into the usual bowl. A handle 20 is located at the front of the basket and rearwardly the basket is dished at 22 to fit the projection 24 of the bowl. A chute 26 is slidably mounted in the guide 28 on the rear upper edge of the basket and this chute is adapted to be located under and adjusted with relation to the inlet tube 12.

A wire yoke 30 is pivotally mounted in the basket and urged downwardly by springs 32 on shaft 33 to hold down the diapers or other items to be laundered.

Under the basket I provide a tube 34 for the rod 36 and slots 38 in the tube permit movement of the rod by grip 40. At the lower end of the rod and secured thereon at 41 I use a valve plate 42 reciprocable by actuation of the rod and formed with a cut-out 44 for the overflow pipe 46 having its upper end 47 at the top of the rear of the basket.

With the basket in position and housing a quantity of items to be laundered, the valve 42 is moved down to position to close the passage 8 and the hopper is filled by releasing the valve in the usual flushing tank. The water will fill the hopper to the level of the overflow pipe 46 and when soaked sufficiently the valve 42 may be opened. The operation may be repeated as many times as may be necessary to fully wash the diapers.

The chute in the path of the rear stream from tube 12 will diffuse the water over the items held down by the yoke and the water from the peripheral tube will flow through the basket to aid in the cleaning.

From the above description it will be apparent that the basket of my invention will permit the safe and easy washing of such items as diapers without danger to the plumbing and without using the hands.

Having thus fully described my invention what I claim as new and desire to secure by Letters Patent is:

1. A laundry basket of wire mesh for use in a toilet bowl, said basket having a sloping bottom and ovate side wall, a valve on the basket adapted to close the bowl outlet and actuating means therefor, and an overflow pipe terminating upwardly at the upper basket level, and extending through the valve.

2. A laundry basket of wire mesh for use in a toilet bowl, said basket having a sloping bottom and ovate side wall, a chute rearward of the basket and adapted to be aligned under the rear inlet tube of the bowl to diffuse the water over the basket, a valve on the basket adapted to close the bowl outlet and actuating means therefor, and an overflow pipe terminating upwardly at the upper basket level, and extending through the valve.

3. A laundry basket of wire mesh for use in a toilet bowl, said basket having a sloping bottom and ovate side wall, a valve on the basket adapted to close the bowl outlet and actuating means therefor, an overflow pipe terminating upwardly at the upper basket level and extending through the valve, and a spring pressed yoke in the basket to press down upon the laundry.

4. A laundry basket of wire mesh for use in a toilet bowl, said basket having a sloping bottom and ovate side wall, a valve plate on the basket adapted to close the bowl outlet and actuating means therefor, and on overflow pipe terminating upwardly at the upper basket level, and extending through the valve.

5. A laundry basket of wire mesh for use in a toilet bowl, said basket having a sloping bottom and ovate side wall, a valve on the basket adapted to close the bowl outlet and a reciprocable actuating rod therefor, and an overflow pipe terminating upwardly at the upper basket level, and extending through the valve.

6. A laundry basket of wire mesh for use in a toilet bowl, said basket having a sloping bottom and ovate side wall, an adjustable chute rearward of the basket and adapted to be aligned under the rear inlet tube of the bowl to diffuse the water over the basket, a valve on the basket adapted to close the bowl outlet and actuating means therefor, and an overflow pipe terminating upwardly at the upper basket level, and extending through the valve.

7. A laundry basket of wire mesh for use in a toilet bowl, said basket having a sloping bottom and ovate side wall, a chute rearward of the basket and adapted to be aligned under the rear inlet tube of the bowl to diffuse the water over the basket, a valve on the basket adapted to close the bowl outlet and actuating means therefor, and an overflow pipe terminating upwardly at the upper basket level, and extending through the valve, and a spring pressed yoke in the basket to press down upon the laundry.

WILLIAM S. BERRY.

REFERENCES CITED

The following references are of record in the file of this patent:

UNITED STATES PATENTS

| Number | Name | Date |
|---|---|---|
| 938,961 | Brewer | Nov. 2, 1909 |
| 944,071 | Brewer | Dec. 21, 1909 |
| 1,473,209 | Cook | Nov. 6, 1923 |